United States Patent [19]

Hockaday et al.

[11] Patent Number: 4,749,249
[45] Date of Patent: Jun. 7, 1988

[54] FIBER-OPTIC ROTARY COUPLER WITH LOSSY MICROBENDS

[75] Inventors: Bruce D. Hockaday, Vernon, Conn.; Kenneth D. Taylor, Oakton, Va.

[73] Assignee: United Technologies Corporation, Hartford, Conn.

[21] Appl. No.: 831,035

[22] Filed: Feb. 19, 1986

[51] Int. Cl.⁴ .............................. G02B 6/36; H01J 5/16
[52] U.S. Cl. .................. 350/96.20; 350/96.15; 350/96.16; 350/96.29; 350/96.30; 350/96.31; 250/227; 250/236
[58] Field of Search .............................. 310/231, 232; 350/96.10, 96.31, 96.15, 96.20, 96.29, 96.21, 96.30, 96.16, 371, 372; 250/227, 234, 235, 236

[56] References Cited

U.S. PATENT DOCUMENTS

| | | | |
|---|---|---|---|
| 3,982,123 | 9/1976 | Goell et al. | 250/227 |
| 4,109,997 | 8/1978 | Iverson | 350/96.15 X |
| 4,165,913 | 8/1979 | Fitch | 350/96.15 |
| 4,460,242 | 7/1984 | Birch et al. | 350/96.20 |
| 4,530,078 | 7/1985 | Lagakos et al. | 350/96.29 X |
| 4,557,550 | 12/1985 | Beals et al. | 350/96.15 |
| 4,557,552 | 12/1985 | Newton et al. | 350/96.15 |
| 4,645,923 | 2/1987 | De Blok et al. | 250/227 |
| 4,672,198 | 6/1987 | Presby | 250/227 |
| 4,705,347 | 11/1987 | Shen et al. | 350/96.15 |

FOREIGN PATENT DOCUMENTS 2177517 1/1987 United Kingdom ............. 350/96.20

*Primary Examiner*—William L. Sikes
*Assistant Examiner*—Brian M. Healy

[57] ABSTRACT

A novel fiber optic rotary coupler for coupling an optical signal between noncontacting opposing surfaces of moving first and second members, includes an optical fiber with the optical signal propagating therein disposed on a microbending means. The microbending means is formed on the first member opposing surface and induces a plurality of lossy microbends in the optical fiber. A portion of the optical signal laterally propagates therethrough across to the second member's opposing surface to a detector positioned therein.

6 Claims, 2 Drawing Sheets

FIBER-OPTIC ROTARY COUPLER WITH LOSSY MICROBENDS

DESCRIPTION

1. Technical Field

This invention relates to noncontacting optical slipring connectors and more particularly to fiber-optic rotary couplers with lossy microbends.

2. Background Art

Noncontacting optical slipring couplers are well known in the art. These devices are used to optically couple a rotating shaft or member to a corresponding stationary one. Typically, a modulated infrared light is used to transmit instrumentation signals between the rotating and non-rotating members.

Optical sliprings are preferable to mechanical sliprings because the latter uses sliding metallic electrical contacts that are expensive, have a limited life expectancy and require frequent maintenance. Moreover, they often have poor signal-to-noise ratio at high rotational speeds.

Optical slipring connectors of the prior art include the optical slipring of M. L. Iverson disclosed in U.S. Pat. Nos. 4,109,997 and 4,109,998. These devices employ a series of concentric angular mirrors and at least one transparent window. An optical signal is injected into the cavity and optical coupling is provided by reflection therein. Both of these devices require complicated prisms and mirrors to perform the desired optical coupling.

Additionally, the prior art includes the optical slipring of A. H. Fitch, disclosed in U.S. Pat. No. 4,165,913. This apparatus comprises a rotating optical shaft which has an optical fiber attached thereto. Optical signals are provided to one end of the optical fiber and propagate around the rotating shaft through the optical fiber itself. Optical coupling is accomplished by altering the cladding of the optical fiber. Known methods of modification include removing a portion of the cladding by such conventional techniques as sanding or chemical etching. A second technique involves carefully slitting the cladding of the optical fiber. Light propagating through the core of the optical fiber will leak out to detectors which are placed on the stationary member. Similarly, light from an emitter array will propagate into the fiber in a similar fashion.

Rotary optical couplers of the prior art which do not involve fragile optical components take advantage of the simplicity of optical fibers. However, the devices constructed with optical fibers are themselves burdened by elaborate machining or chemical etching of fiber optic cladding. Alternatively, detailed manufacturing procedures, such as fabricating a series of slits along the outer surface of the fiber are both cumbersome and expensive.

DISCLOSURE OF INVENTION

An object of the present invention is to provide a noncontacting fiber optic slipring for coupling optical signals between moving opposing members.

According to the present invention, a fiber optic slipring apparatus having first and second members moving relative to each other that have noncontacting opposing surfaces includes an optical fiber possessing a longitudinal outer cladding and inner core that has a parabolic gradient of index of refraction. An optical signal longitudinally propagates therethrough. Also included is a microbending means that is disposed on the first member opposing surface which is adapted to receive the optical fiber. The microbending means induces a plurality of lossy microbends in the optical fiber which provide at the microbends for lateral propagation of a portion of the optical signal across the optical fiber. The fiber optic slipring apparatus also includes a detector for receiving the lateral optical signal in the second member.

BEST MODE FOR CARRYING OUT THE INVENTION

Figure 1:
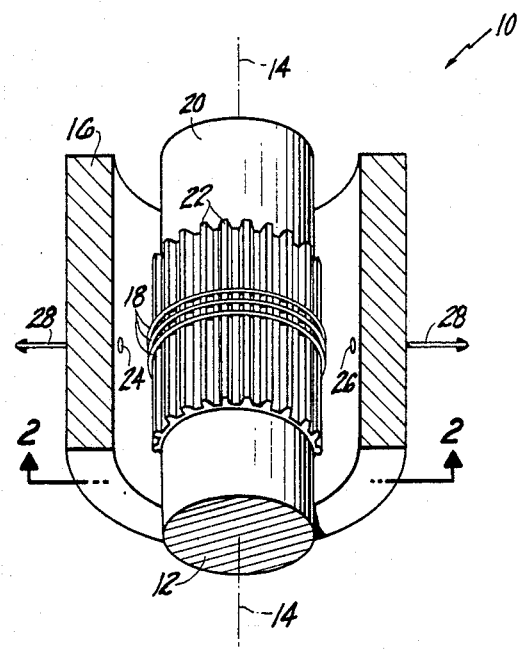
FIG. 1 is an illustration partially in perspective and partially in section of a fiber optic rotary coupler provided according to the present invention.

Referring first to FIG. 1, in an illustration partially in perspective and partially in section a fiber optic rotary coupler with lossy microbends 10 includes shaft 12 which rotates about axis 14. Alternatively, the shaft may be stationary while housing 16 rotates about the axis. In either case, opposing surfaces thereof rotate freely without mechanical contact.

Optical fiber 18 is a conventional graded index fiber and is drawn about outer shaft surface 20 so as to be disposed on a series of periodic ridges 22 formed thereon longitudinally with respect to the axis. The periodic ridges comprise a means for inducing a sequence of microbends in the drawn optical fiber. The optical fiber is fastened to the shaft by conventional techniques which in the best mode embodiment comprises a conventional transparent potting compound or epoxy. An optical signal propagating within the optical fiber will laterally propagate out from the core through the outer cladding. Alternatively, an optical signal presented to the fiber will be laterally transmitted through the cladding and any outer buffer thereon and propagate in the core along the length of the optical fiber. Typically, the optical signal comprises an infrared signal from a conventional signal source having a wavelength of approximately 0.850 microns. In the best mode embodiment the infrared optical signal is frequency modulated by conventional techniques to reduce amplitude distortion. Those skilled in the art will note that equivalent optical signals may be substituted.

In the best mode embodiment the housing is stationary relative to the shaft and contains a means for receiving the optical signal. Optical detectors 24 and 26 are positioned to be in optical communication with the optical fiber. The number and position of the optical detectors should be selected so as to ensure adequate signal-to-noise ratio. In the best mode embodiment the optical detectors comprise conventional photodiodes.

The optical signal received by the detectors is converted to an electrical signal equivalent and is provided on lines 28 to conventional amplification and signal processing means not present and not part of the present invention that depend on the coupler's application.

Figure 2:
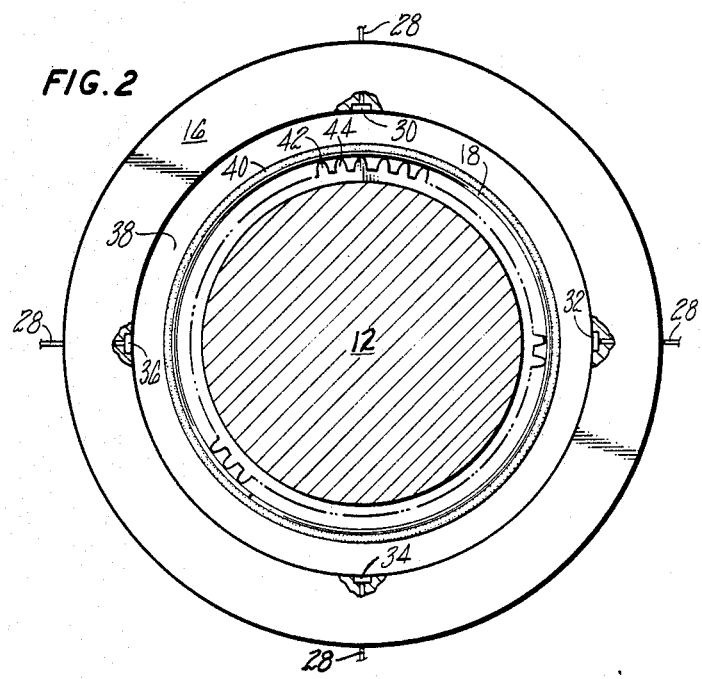
FIG. 2 is a sectioned drawing illustrating a portion of the fiber optic rotary coupler of FIG. 1.

FIG. 2 is a sectioned drawing illustrating a portion of the fiber optic rotary coupler of FIG. 1. Unlike prior art mechanical sliprings which use sliding metallic contact there is no physical contact between housing 16 and shaft 12 as they move relative to one another. Detectors 30, 32, 34 and 36 are positioned to receive an optical signal which is transmitted across air gap 38 from the optical fiber (20, FIG. 1) contained within potting 40.

As described hereinabove, a plurality of longitudinal ridges are formed in the outer shaft surface, of which ridges 42 and 44 are examples. In the best mode embodiment each ridge has a rectangular profile formed by conventional techniques. For each ridge two microbends are formed in the optical fiber at the ridges outer corners. Those skilled in the art will note that other ridges having different profiles may be substituted. For example, ridges having a sinusoidal profile may be employed, producting one microbend per ridge in the optical fiber.

The microbends are lossy, allowing optical energy to laterally propagate through the fiber's transparent cladding and buffer layer (if any). Optical fibers having a graded or parabolic index of refraction constrain the optical energy difference between optical modes propagating in both the core and the cladding to be equal. Consequently, all of the propagating modes are available to provide or receive optical energy. Step index multimode optical fibers are ill suited for optical slipring applications because optical energy cannot readily be transferred between the prooagating optical modes. As is well known, the amount of energy transfer between propagating modes is a function of the periodicity of the microbends as well as the gradient of the index of refraction, fiber core size, and the wavelength of optical signal.

For fiber optic rotary couplers provided according to the present invention the periodicity of ridges must be selected so as to ensure a maximum leakage of light through the optical fiber cladding. In the best mode embodiment the periodicity of the microbends are selected to be approximately 1.1 millimeters for an optical fiber with a 100 micron core and an ootical signal of approximately 0.850 microns propagating therein.

Those skilled in the art will note that other equivalent graded index multimode optical fibers or step index single mode optical fibers can be substituted.

Figure 3:
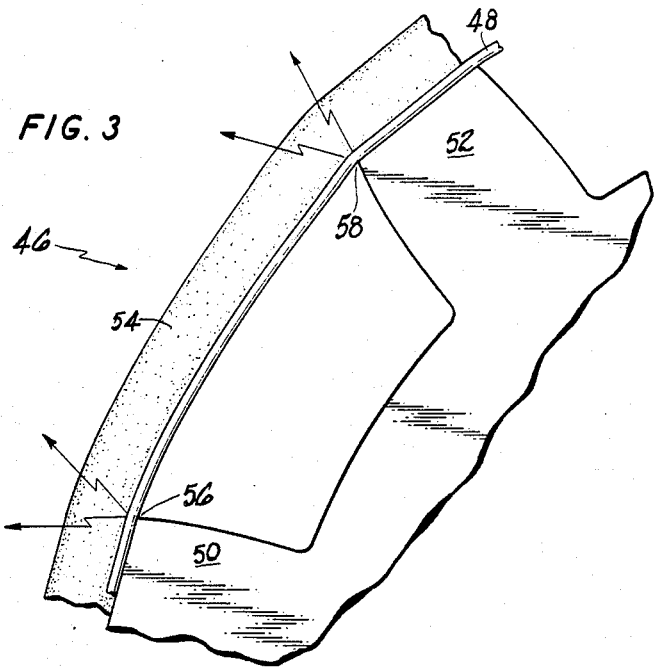
FIG. 3 is a sectioned illustration of a portion of the fiber optic rotary coupler of FIG. 1 showing microbends therein.

FIG. 3 is an expanded sectioned illustration of a portion 46 of the fiber optic rotary coupler of FIG. 2. Optical fiber 48 is disposed on ridges 50 and 52, two of the plurality of ridges described hereinabove. Transparent potting 54 fastens the optical fiber. Drawing the fiber across the ridges as shown will produce bends 56 and 58 in the fiber ridges allowing a portion of the optical signal propagating therein to leak out. The bend produced is commonly referred to as a microbend by those skilled in the art. Microbends are produced by periodic physical bending of the optical fiber causing the optical propagational modes to couple both one to another and between the cladding and core of the optical fiber. Microbends and their attendant losses have been studied in great detail with regard to long distance optical communication. Consequently, the optical loss and amount of optical signal coupled into or out of the fiber can be predicted by well known techniques for a given optical fiber and set of bending parameters.

Similarly, those skilled in the art will also note a microbend will equivalently allow a light signal propagating from the exterior of the optical fiber into the fiber.

The use of lossy microbends as a means of optical coupling mark a point of departure of the invention over the prior art. Prior art rotary optical couplers which used optical fibers provided optical coupling by altering the cladding of the optical fiber either physically or chemically. In the fiber optic rotary coupler provided according to the present invention the optical fiber itself is not physically altered. Rather, it is manipulated to produce a series of lossy microbends to provide the optical coupling. Those skilled in the art will note that it is substantially simpler to fabricate a microbending structure in a shaft or housing which typically are metal than it is to machine or handle delicate optical fibers.

Figure 4:
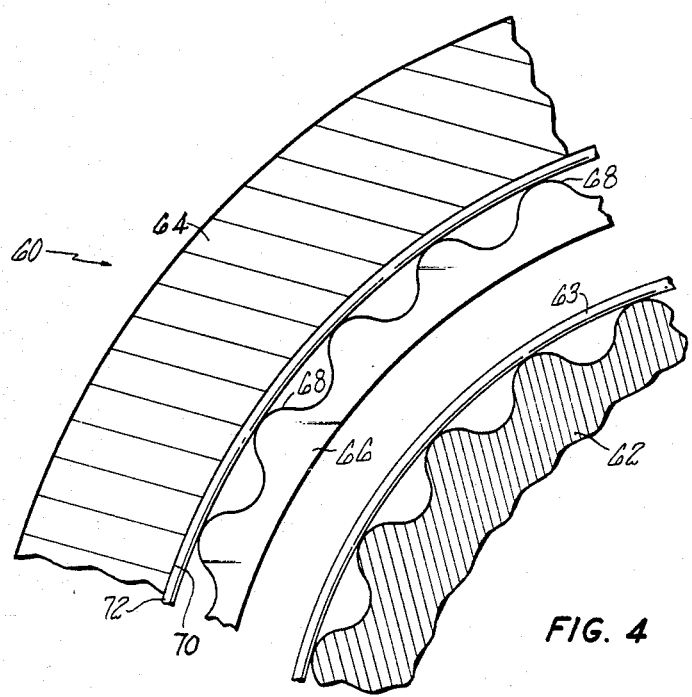
FIG. 4 is a sectioned illustration of an alternative embodiment of the fiber optic rotary coupler provided according to the present invention.

FIG. 4 is a sectioned illustration of an alternative embodiment 60 of the fiber optic rotary coupler provided according to the present invention. The alternative embodiment includes shaft 62 and housing 64 rotating with respect to one another. First optical fiber 63 is similar to that described with respect to the best mode embodiment and is drawn on to the shaft in a fashion described hereinabove.

The alternative embodiment is characterized by a transparent collar 66 having periodic ridges 68 formed on an outer surface and which is disposed by conventional techniques on inner housing surface 70. The collar and shaft move freely with respect to each other. A second optical fiber 72, similar to the first optical fiber is drawn on to the periodic ridges in the collar; producing microbends therein. The optical fibers are positioned to be in optical communication with each other. A conventional optical signal source and detectors are remotely located either on the opposing surfaces of the rotating members or on the members themselves. Optical coupling between the optical fibers of a propagating optical signal in one of the optical fibers is accomplished in the fashion described hereinabove.

Similarly, although the invention has been shown and described with respect to a best mode embodiment thereof, it should be understood by those skilled in the art that various other changes, omissions, and additions thereto may be made therein without departing from the spirit and scope of the invention. Although only cylindrical members rotating with regard to each other are described with respect to the best mode embodiment, those skilled in the art will note that noncylindrical members and movement other than rotational can be substituted.

We claim:

1. Fiber optic slipring apparatus for coupling an optical signal between first and second members moving relative to one another and having noncontacting opposing surfaces, said slipring apparatus comprising:

fiber optic means having a longitudinal outer cladding and an inner core, also having a parabolic gardient of index of refraction, said fiber optic means longitudinally propagating the optical signal therethrough, microbending means disposed on the first member opposing surface adapted to receive said fiber optical means, said microbending means inducing a multiplicity of periodic lossy microbends in said fiber optic means, arrayed in the direction of relative movement of said first and second members, providing lateral propagation of a portion optical signal thereacross at said microbends, and detector means for receiving said lateral optical signal in the second member.

2. The fiber optic slipring apparatus of claim 1, wherein said microbending means comprises a periodic series of ridges in said first member surface.

3. The fiber optic slipring apparatus of claim 1, wherein said core of said fiber optic means comprises a diameter of approximately 100 microns.

4. The fiber optic slipring apparatus of claim 2, wherein said ridges have a periodicity of approximately 1.1 millimeters.

5. The fiber optic slipring apparatus of claim 1, wherein said detector means additionally comprises a second microbending means disposed in the second member opposing surface receiving a second fiber optic means positioned in optical communication with said first fiber optic means.

6. The fiber optic slipring apparatus of claim 5, wherein said second microbending means additionally comprises an optically transparent tube having a series of ridges formed on a surface receiving said fiber optic means.

* * * * *